(12) United States Patent
Nagasawa (10) Patent No.: US 12,522,297 B2
(45) Date of Patent: Jan. 13, 2026

(54) VEHICLE-BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 315 days.

(21) Appl. No.: 18/470,006

(22) Filed: Sep. 19, 2023

(65) Prior Publication Data

US 2024/0116573 A1    Apr. 11, 2024

(30) Foreign Application Priority Data

Oct. 6, 2022   (JP) ................................. 2022-161990

(51) Int. Cl.
    *B62D 21/15*    (2006.01)
    *B62D 21/03*    (2006.01)
    *B62D 21/11*    (2006.01)

(52) U.S. Cl.
    CPC ........... *B62D 21/152* (2013.01); *B62D 21/03* (2013.01); *B62D 21/11* (2013.01); *B62D 21/155* (2013.01)

(58) Field of Classification Search
    CPC ...... B62D 21/152; B62D 21/03; B62D 21/11; B62D 21/155; B62D 25/082; B62D 25/085
    See application file for complete search history.

(56) References Cited

U.S. PATENT DOCUMENTS

| | | | | |
|---|---|---|---|---|
| 2012/0049571 A1* | 3/2012 | Katou | .................. | B62D 21/152 296/187.09 |
| 2012/0248820 A1* | 10/2012 | Yasui | .................. | B62D 21/152 296/193.09 |
| 2014/0091595 A1* | 4/2014 | Ramoutar | ............... | B60R 19/24 293/150 |
| 2015/0274209 A1* | 10/2015 | Basappa | ................. | B60R 19/04 296/187.1 |
| 2017/0088178 A1* | 3/2017 | Tsukada | .................. | B60L 50/64 |

FOREIGN PATENT DOCUMENTS

JP    2020-083144 A    6/2020

* cited by examiner

*Primary Examiner* — Timothy Hannon
(74) *Attorney, Agent, or Firm* — Smith, Gambrell & Russell, LLP (57) ABSTRACT

A vehicle-body front structure includes front side frames, sub frames, lap frames, and reaction-transmitting frames. The lap frames are coupled to front lower parts of respective sub frames and each project toward an outer front side. The reaction-transmitting frames are coupled to lower rear parts of the respective sub frames and each project toward an outer rear side. Each sub frame includes in the central portion an oblique part extending toward an inner rear side and along which the sub frame is widened. A power unit is fixed to the oblique part. An axial line of each lap frame is parallel to the oblique part of one of the sub frames that is on a same side as the each lap frame in the vehicle widthwise direction and to a front edge of one of the reaction-transmitting frames that is on an opposite side from the each lap frame.

2 Claims, 7 Drawing Sheets

VEHICLE-BODY FRONT STRUCTURE

CROSS-REFERENCE TO RELATED APPLICATIONS

The present application claims priority from Japanese Patent Application No. 2022-161990 filed on Oct. 6, 2022, the entire contents of which are hereby incorporated by reference.

BACKGROUND

The disclosure relates to a vehicle-body front structure.

To reduce injuries to the occupants of a vehicle in an accident with frontal collision, it is in general effective to reduce the probability of deformation of the cabin, the space provided for occupants. Various measures for reducing the probability of deformation of the cabin have been taken.

One of the measures taken in recent years is to absorb collision energy by using a structural body disposed on the front side relative to the cabin.

In some vehicles such as hybrid vehicles and electric vehicles, a battery pack serving as a power source of the vehicle tends to be disposed below the cabin.

The battery pack stores electric power for driving the vehicle. If the battery pack is deformed or wires thereof are broken in frontal collision or the like of the vehicle, a sudden abnormal reaction may occur.

Therefore, the attention to a structure that reduces the probability of deformation of the cabin so as not to damage the battery pack has been growing for vehicles such as hybrid vehicles and electric vehicles.

To meet such a demand, a technique intended for battery-equipped vehicles such as hybrid vehicles and electric vehicles has already been disclosed in which, for example, front side members are configured to deform in a controlled manner if the vehicle receives any impact of frontal collision, whereby collision energy is absorbed, and a driving motor disposed in a front part of the vehicle is thus protected (see Japanese Unexamined Patent Application Publication (JP-A) No. 2020-083144, for example).

SUMMARY

An aspect of the disclosure provides a vehicle-body front structure including front side frames in a pair, sub frames in a pair, a power unit, lap frames in a pair, and reaction-transmitting frames in a pair. The front side frames are disposed in a front part of a vehicle on respective sides in a vehicle widthwise direction and each extend in a vehicle front-rear direction. The sub frames are disposed below the respective front side frames on the respective sides in the vehicle widthwise direction and each extend in the vehicle front-rear direction. The power unit is disposed between the sub frames in the vehicle widthwise direction and is configured to drive front wheels of the vehicle. The lap frames each include one end coupled to a corresponding one of the sub frames at a front part of a lower surface of the sub frame, and another end projecting toward an outer front side of the vehicle. The reaction-transmitting frames each include one end coupled to a corresponding one of the sub frames at a lower surface of a rear end of the sub frame, and another end projecting toward an outer rear side of the vehicle. Each of the sub frames includes an oblique part in a central portion of the each of the sub frame. The oblique part extends toward an inner rear side of the vehicle. Each of the sub frames has a greater width on a rear side relative to the oblique part than on a front side relative to the oblique part. The power unit is in contact with and fixed to the oblique part of each of the sub frames that is on a corresponding one the respective sides in the vehicle widthwise direction. An axial line of each of the lap frames is parallel to an edge line of the oblique part of one of the sub frames that is on a same side as the each of the lap frame in the vehicle widthwise direction and to an edge line of a front edge of one of the reaction-transmitting frames that is on an opposite side from the each of the lap frames in the vehicle widthwise direction.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Frontal collision of a vehicle includes several situations: for example, full-overlap collision in which the vehicle collides with an object over the entirety of the front face thereof, offset collision in which the vehicle collides with an object at one side of the front face thereof, and small-overlap collision in which the rate of offset is about 25%.

What is to be provided is a structure that reduces the probability of deformation of the cabin and the battery pack by absorbing collision energy with the use of a structural body disposed on the front side relative to the cabin or the battery pack, and that is applicable to each of different collision situations.

According to JP-A No. 2020-083144, a cross member includes fragile parts. If front side members disposed on the respective lateral sides of the vehicle are bent inward in the vehicle widthwise direction, the fragile parts receive the respective front side members. Thus, collision energy occurring in each of different collision situations is more assuredly absorbed.

However, JP-A No. 2020-083144 provides little consideration for an impact-absorbing structure as a protection of the cabin or the battery pack disposed on the rear side of the vehicle relative to the cross member. Therefore, if collision energy is transmitted to a part of the vehicle that is on the rear side relative to the fragile parts provided for receiving the front side members disposed on the lateral sides of the vehicle, the cabin or the battery pack may be deformed.

In view of the above, it is desirable to provide a vehicle-body front structure configured to reduce the probability of deformation of the cabin and the battery pack in each of different situations of frontal collision.

A vehicle V, to which a vehicle-body front structure S according to the present embodiment is applied, will now be described with reference to FIGS. 1 to 7. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The drawings have arrows as appropriate. Arrow FR points toward the front side of the vehicle V, illustrated in FIG. 1. Arrow UP points toward the upper side of the vehicle V in front view. Arrow LH points toward the left side of the vehicle V in front view. Directions to be expressed in the following description by using terms such as upper, lower, front, rear, left, and right refer to the respective directions of the vehicle V in front view, unless otherwise stated.

Embodiment

Referring to FIGS. 1 to 4, the vehicle-body front structure S according to the present embodiment included in the vehicle V will now be described.
Configuration of Vehicle V The vehicle V is, for example, an electric vehicle including a power unit 20, which serves as a drive source. The vehicle V may alternatively be, for example, a hybrid electric vehicle including an engine and the power unit 20 both serving as drive sources.

Figure 1:
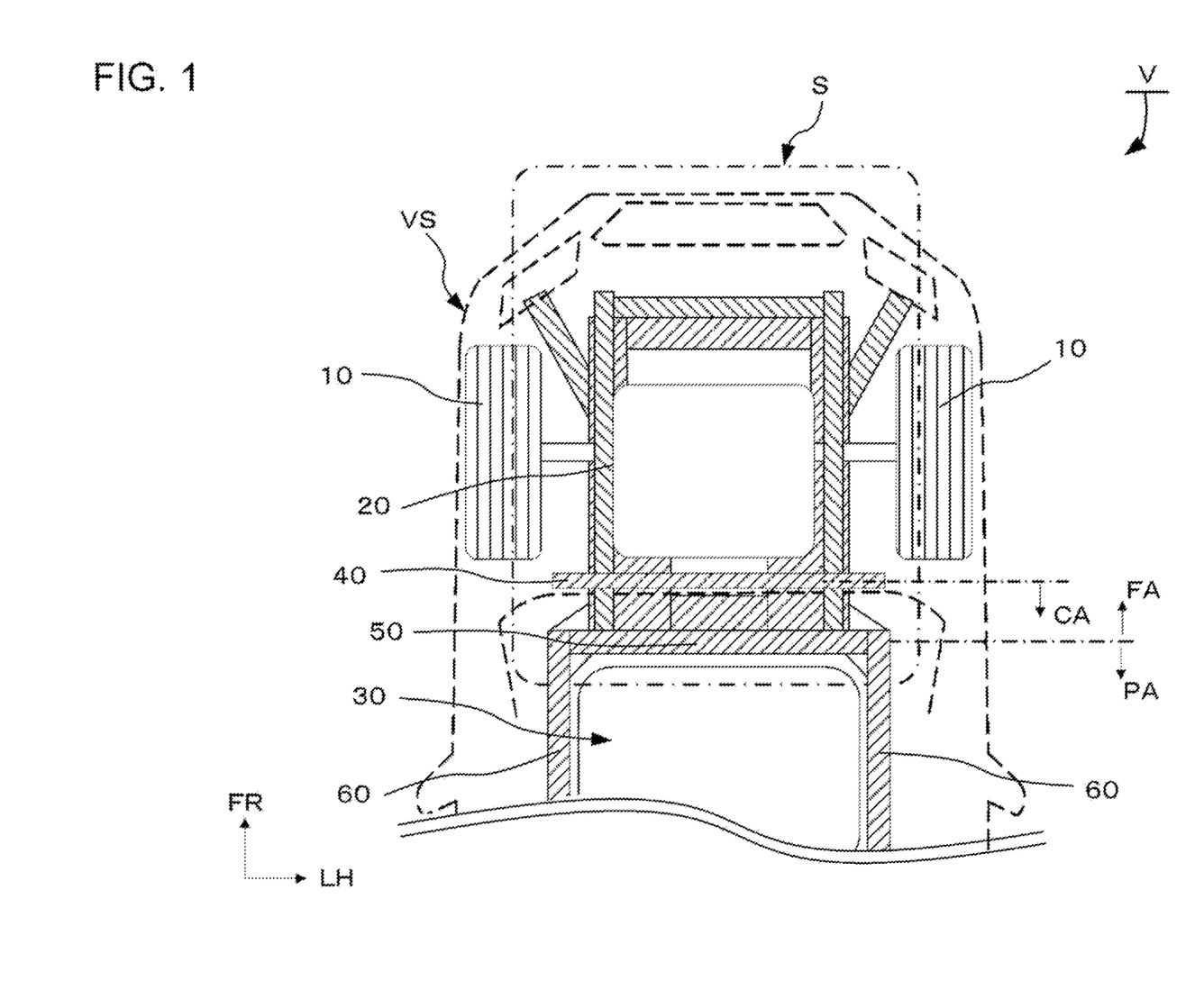
FIG. 1 is a top view of a vehicle according to an embodiment of the disclosure.

As illustrated in FIG. 1, the vehicle V has a vehicle body VS, in which front wheels 10, the power unit 20, a battery pack 30, a toeboard 40, a torque box 50, side sills 60, and the vehicle-body front structure S (the hatched part enclosed by the one-dot chain line in FIG. 1) are disposed.

The power unit 20 is a driving device including, but not illustrated, a motor configured to drive the front wheels 10, and other elements such as a gearbox, a clutch, and a drive shaft. The power unit 20 is disposed in a space enclosed by sub frames 200 and sub cross members 210, which are to be described separately below. The power unit 20 is mounted on and fixed to the sub frames 200.

The battery pack 30 has, for example, a flat box shape. The battery pack 30 includes a number of battery cells that are coupled in series, thereby being capable of outputting high-voltage power to be supplied to the power unit 20. The battery pack 30 stores power with which the vehicle V is caused to travel. The battery pack 30 is disposed in a space enclosed by a rigid frame formed of the torque box 50, the side sills 60, and so forth to be described separately below. The battery pack 30 is intended for vehicles such as electric vehicles (EV) and hybrid electric vehicles (HEV).

The toeboard 40 is disposed at the front of a cabin CA and stands upright in the top-bottom direction. The toeboard 40 serves as a partition that separates, in the vehicle V, the front-wheel-driving device and the cabin CA from each other. The toeboard 40 is coupled to upper rear parts of front side frames 100, to be described below, by welding or the like.

The torque box 50 is disposed between the front side frames 100 and the side sills 60, to be described below, and couples the front side frames 100 to the side sills 60. The torque box 50 is a skeletal frame extending in the vehicle widthwise direction at the bottom of the vehicle V and is coupled to one end of each of the front side frames 100 by welding or the like. The front side frames 100 are disposed on the two respective sides of the torque box 50 in the vehicle widthwise direction. The torque box 50 is made of highly rigid metal or the like and has a cross section of a substantially rectangular closed shape. The torque box 50 is located on the front side relative to the battery pack 30. The two ends of the torque box 50 are each coupled to one end of a corresponding one of the side sills 60 by welding or the like. The side sills 60 are disposed on the two respective sides of the torque box 50 in the vehicle widthwise direction.

The one end of each of the front side frames 100 disposed on the two respective sides of the torque box 50, to be described below, in the vehicle widthwise direction is coupled to an upper front part of the torque box 50 by welding or the like.

An area of the vehicle V that is on the rear side relative to the torque box 50 is a protected area PA. The protected area PA is intended to reduce the probability of deformation of the cabin CA and the battery pack 30, which are located on the upper side and the lower side, respectively, in the protected area PA.

The side sills 60 are disposed at the bottom of the vehicle V on the two respective sides in the vehicle widthwise direction. The side sills 60 are skeletal frames each extending in the vehicle front-rear direction. The side sills 60 are made of highly rigid metal or the like and each have a cross section of a substantially rectangular closed shape. The side sills 60 form bases in the protected area PA and lie on the two respective sides in the vehicle widthwise direction.

The vehicle-body front structure S is disposed in a vehicle front space FA, which is located on the front side relative to the torque box 50. The vehicle-body front structure S is configured as follows.
Configuration of Vehicle-Body Front Structure S The vehicle-body front structure S according to the present embodiment will now be described with reference to FIGS. 2 to 4.

The vehicle-body front structure S has a bilaterally symmetrical configuration in the vehicle widthwise direction.

Figure 2:
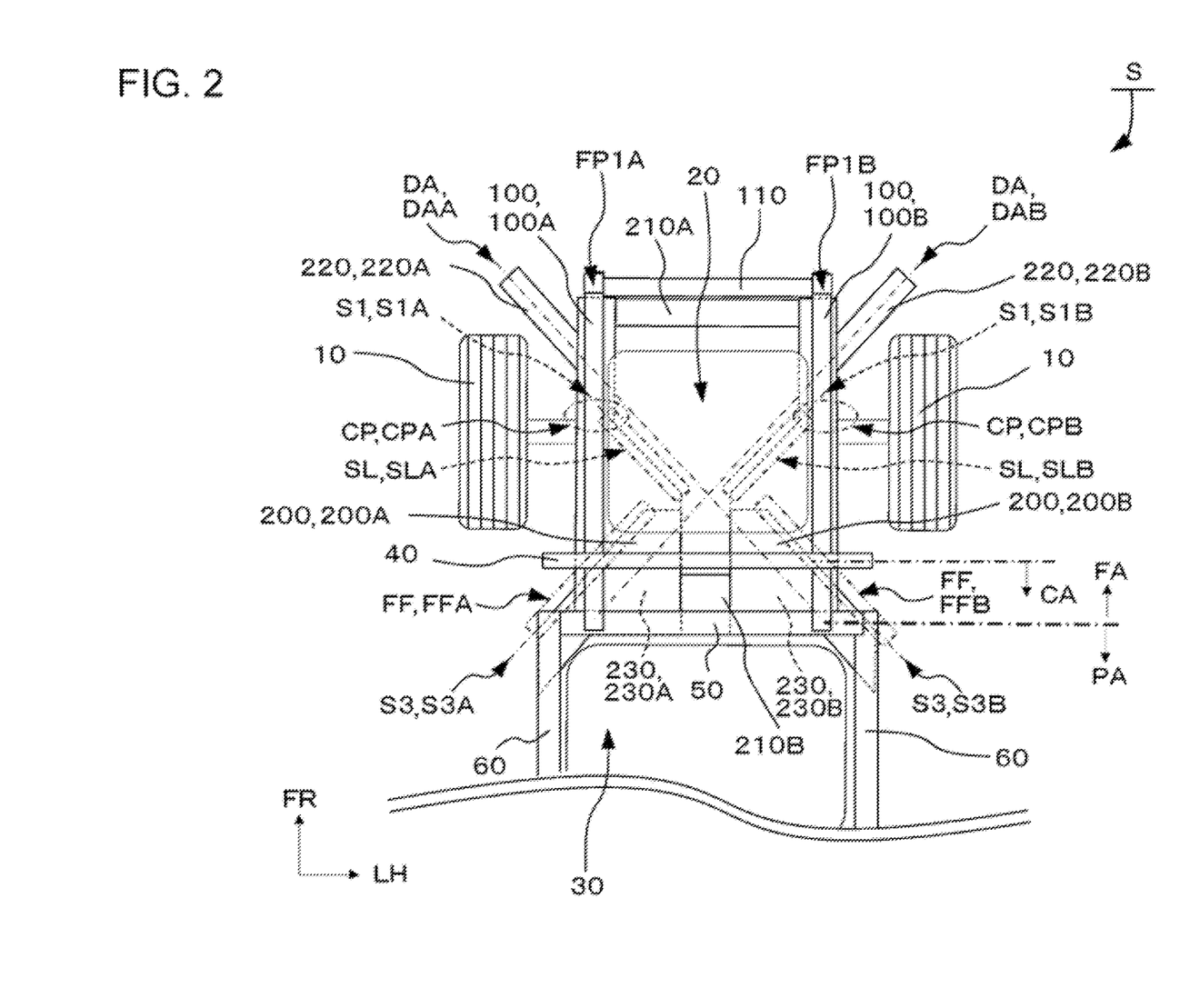
FIG. 2 is a top view of a vehicle-body front structure included in the vehicle illustrated in FIG. 1.

As illustrated in FIG. 2, the vehicle-body front structure S includes the front side frames 100 (front side frames 100A and 100B), a cross member 110, the sub frames 200 (sub frames 200A and 200B), the sub cross members 210 (sub cross members 210A and 210B), lap frames 220 (lap frames 220A and 220B), and reaction-transmitting frames 230 (reaction-transmitting frames 230A and 230B).
Front Side Frames 100

Figure 3:
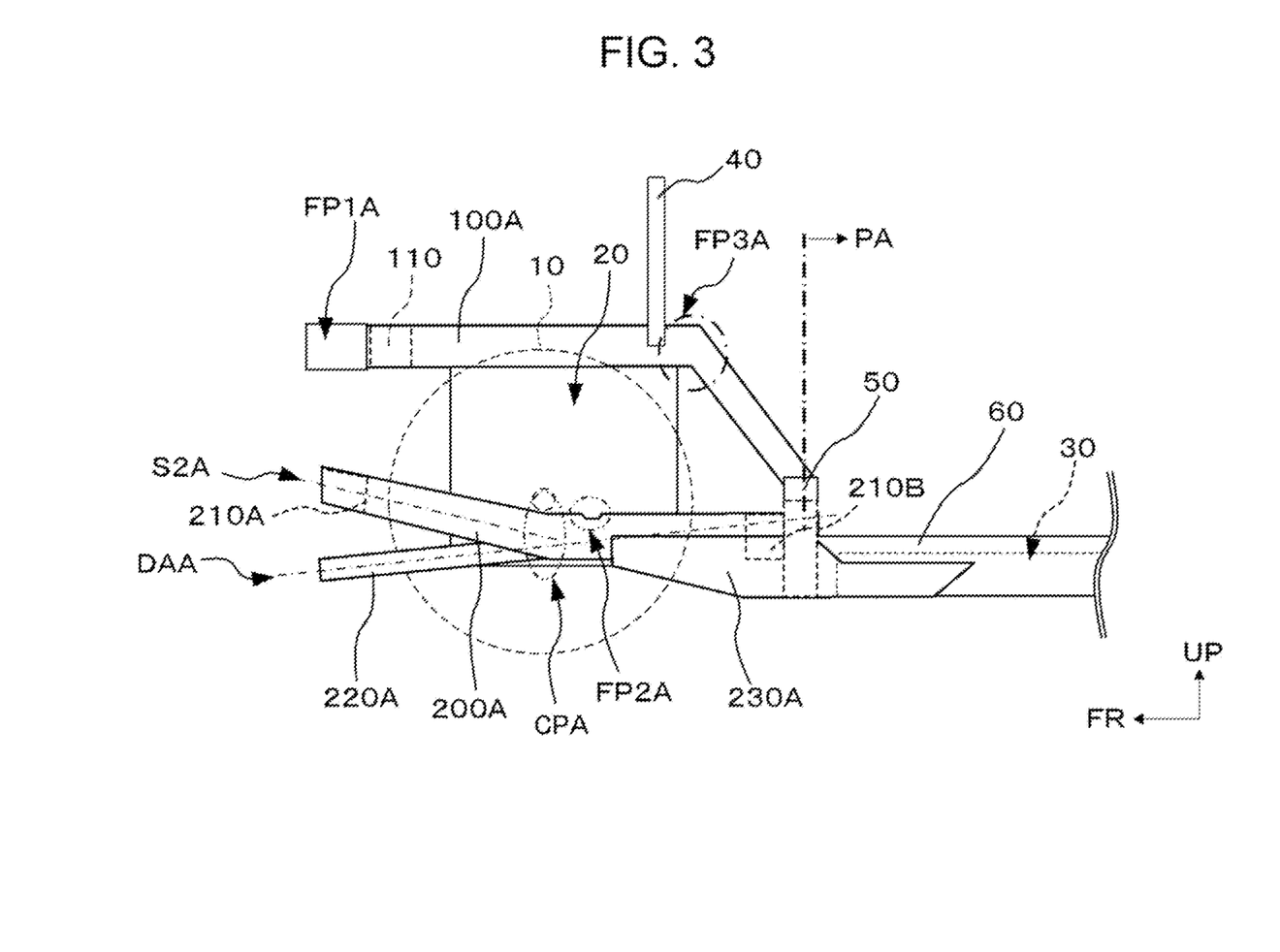
FIG. 3 is a right side view of the vehicle-body front structure illustrated in FIG. 2.

The front side frames 100 are a pair of frames disposed in a front part of the vehicle V on the two respective sides in the vehicle widthwise direction. The front side frames 100 are located above the power unit 20, which drives the front wheels 10 of the vehicle V, and each extend in the vehicle front-rear direction. As illustrated in FIG. 3, the front side frames 100 are each bent at a bent part FP3 (bent part FP3A or FP3B) toward the lower rear side. The toeboard 40 is coupled to the bent parts FP3 (bent parts FP3A and FP3B) of the front side frames 100. The front side frames 100 are each coupled at the rear end thereof to the torque box 50 by welding or the like. The front side frames 100 are skeletal frames of the vehicle V. The front side frames 100 are made of highly rigid metal or the like and each have a cross section of a substantially rectangular closed shape.

The front side frames 100 include at the respective front ends thereof respective fragile parts FP1 (fragile parts FP1A and FP1B). The fragile parts FP1 are made of, for example, a material that is weaker than the front side frames 100 and each have a cross section of a substantially rectangular closed shape.

Cross Member 110

As illustrated in FIG. 2, the cross member 110 extends in the vehicle widthwise direction between the front ends of the front side frames 100. The two ends of the cross member 110 are coupled by welding or the like to the respective front side frames 100 disposed on the two respective sides in the vehicle widthwise direction. The cross member 110 is made of metal or the like and has a cross section of a substantially rectangular closed shape.

Sub Frames 200

The sub frames 200 are a pair of frames disposed on the two respective sides in the vehicle widthwise direction. The sub frames 200 each extend in the vehicle front-rear direction below the respective front side frames 100 and at the bottom of the power unit 20. The sub frames 200 are made of highly rigid metal or the like and each have a cross section of a substantially rectangular closed shape. The sub frames 200 each include an oblique part SL (SLA or SLB), which extends from a central portion CP (CPA or CPB) of the sub frame 200 toward the inner rear side and forms an edge line S1 (edge lines S1A or S1B). The sub frames 200 each have a greater width on the rear side relative to the oblique part SL than on the front side.

As illustrated in FIG. 3, a portion of each of the sub frames 200 from the central portion CP to the front end has an axial line S2 (axial line S2A or S2B), which extends toward the upper front side. The sub frames 200 each include on the rear side relative to the central portion CP thereof a fragile part FP2 (fragile part FP2A or FP2B), which is a recess provided in the upper surface of the sub frame 200.

Figure 4:
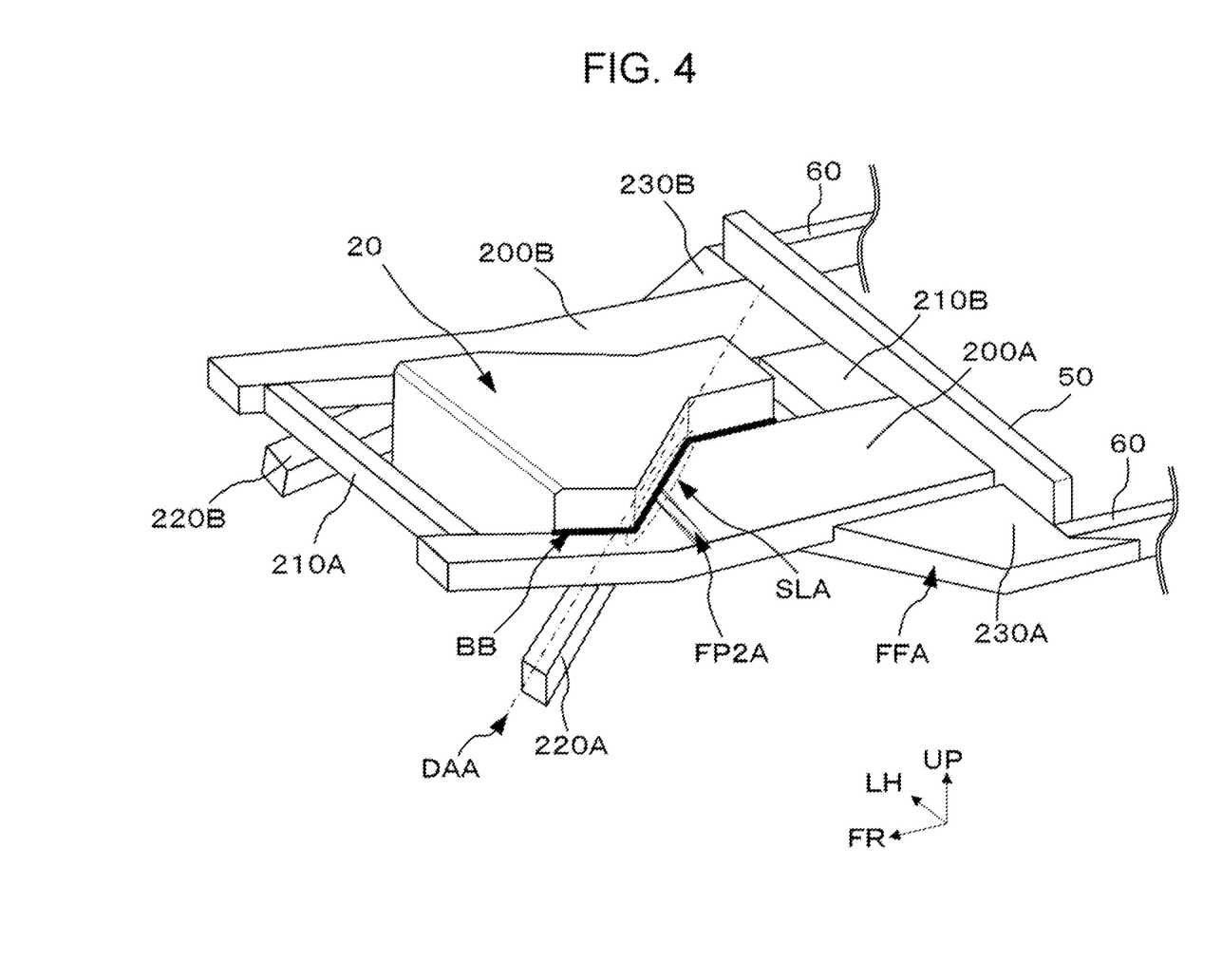
FIG. 4 is an upper perspective view of the vehicle-body front structure illustrated in FIG. 2, with front side frames and a toeboard removed.

The power unit 20 is disposed between and fixed to the sub frames 200 in the vehicle widthwise direction in such a manner as to be in contact with the oblique parts SL of the sub frames 200. For example, as illustrated in FIG. 4, the power unit 20 is held between the sub frames 200A and 200B disposed on the two respective sides in the vehicle widthwise direction, and is fixed thereto. As illustrated by bold line BB, the power unit 20 is in contact mainly with the oblique parts SL of the sub frames 200 in such a manner as to extend along the sub frames 200.

Sub Cross Members 210A, 210B

As illustrated in FIG. 2, the sub cross members 210A and 210B each extend in the vehicle widthwise direction between the sub frames 200 disposed on the two respective sides in the vehicle widthwise direction. The sub cross member 210A is at the front ends of the sub frames 200. The sub cross member 210B is at the rear ends of the sub frames 200. The sub cross members 210A and 210B are made of metal or the like and each have a cross section of a substantially rectangular closed shape. The two ends of the sub cross member 210A in the vehicle widthwise direction are coupled by welding or the like to the sub frames 200 disposed on the two respective sides in the vehicle widthwise direction. The sub cross member 210B is located on the front side relative to the torque box 50 and is coupled by welding or the like to the sub frames 200 on the two respective sides in the vehicle widthwise direction and to the torque box 50.

Lap Frames 220

As illustrated in FIG. 3, the lap frames 220 are located at the bottom of the power unit 20. One end of each of the lap frames 220 is coupled by welding or the like to a corresponding one of the sub frames 200 at a front part of the lower surface of the central portion CP (central portion CPA or CPB). The other end of each of the lap frames 220 projects toward the outer front side of the vehicle V. The positions where the lap frames 220 are coupled to the sub frames 200 are on the front side relative to the fragile parts FP2 (fragile parts FP2A and FP2B). The lap frames 220 are made of metal or the like and each have a substantially bar-like shape, with a cross section of a substantially rectangular closed shape. The lap frames 220 have respective axial lines DA, which are each inclined downward, in side view, from the rear end thereof to the front end thereof.

As illustrated in FIG. 2, each of the lap frames 220 has the axial line DA (axial line DAA or DAB) extending toward the outer front side. The axial line DA is parallel to the edge line S1 of the oblique part SL of one of the sub frames 200 that is on the same side as the lap frame 220 of interest in the vehicle widthwise direction. Furthermore, in plan view and on each of the axial lines DA, a corresponding one of the lap frames 220, a corresponding one of the sub frames 200, the power unit 20, and a corresponding one of the reaction-transmitting frames 230 are aligned and are in contact with and fixed to one another. In one example, on each axial line DA, the lap frame 220 of interest is coupled to the sub frame 200 that is on the same side as the lap frame 220 of interest in the vehicle widthwise direction at the central portion CP, with the oblique part SL of the sub frame 200 being closely in contact with the power unit 20. In this state, the power unit 20 is fixed to the sub frame 200. The power unit 20 is also in contact with and fixed to the oblique part SL of the sub frame 200 that is on the opposite side from the lap frame 220 of interest in the vehicle widthwise direction. Furthermore, the sub frame 200 that is on the opposite side from the lap frame 220 of interest in the vehicle widthwise direction is coupled to one of the reaction-transmitting frames 230 that is on the opposite side from the lap frame 220 of interest in the vehicle widthwise direction.

The lap frames 220 are disposed at such positions that the impact of small-overlap collision that is applied to the front face of the vehicle V is to be received by the front end of one of the lap frames 220. For example, the centers of the front ends of the lap frames 220 are positioned inwardly from the respective widthwise ends of the vehicle V by 25% or less of the vehicle width.

Reaction-Transmitting Frames 230

The reaction-transmitting frames 230 are a pair of frames disposed on the two respective sides in the vehicle widthwise direction and each extend toward the outer rear side. One end of each of the reaction-transmitting frames 230 is coupled by welding or the like to a corresponding one of the sub frames 200 at the lower surface of the rear end of the sub frame 200. The other end of each of the reaction-transmitting frames 230 projects toward the outer rear side of the vehicle V. The reaction-transmitting frames 230 each spread over a corresponding one of the sub frames 200, the torque box 50, and a corresponding one of the side sills 60 and are each coupled thereto by welding or the like.

The reaction-transmitting frames 230 have respective front edges FF (front edges FFA and FFB), which form edge lines S3 (edge lines S3A and S3B) each extending from the inner front side toward the outer rear side. The edge lines S3 are each parallel to the axial line DA of a corresponding one of the lap frames 220.

The vehicle-body front structure S forms a strong skeletal frame of a crisscross configuration in which the sub frames 200A and 200B, the sub cross members 210A and 210B, the torque box 50, the side sills 60, and the reaction-transmitting frames 230A and 230B are coupled to one another.

Functions

Figure 5:
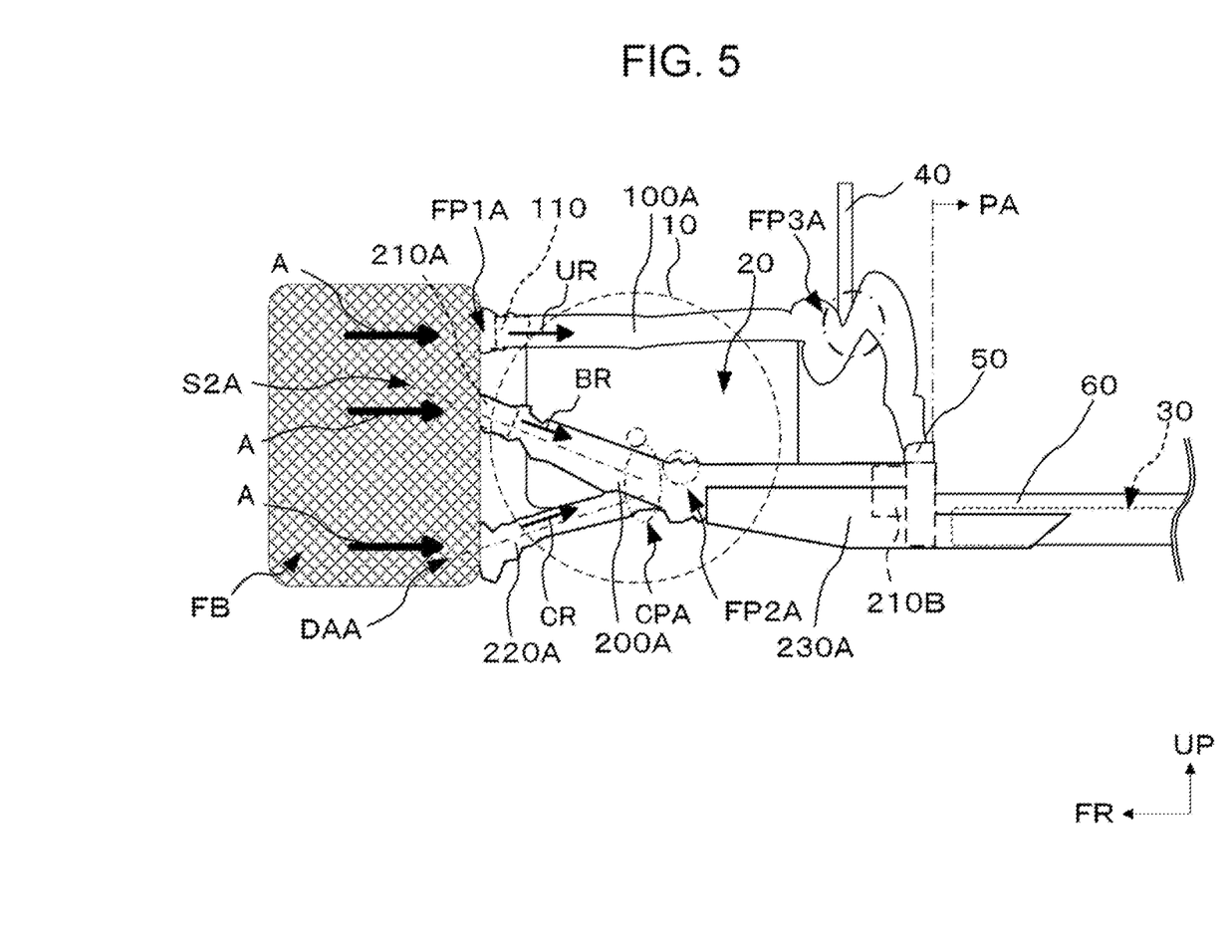
FIG. 5 is a right side view of the vehicle-body front structure according to the embodiment of the disclosure, illustrating how the vehicle-body front structure deforms in frontal collision.
Figure 6:
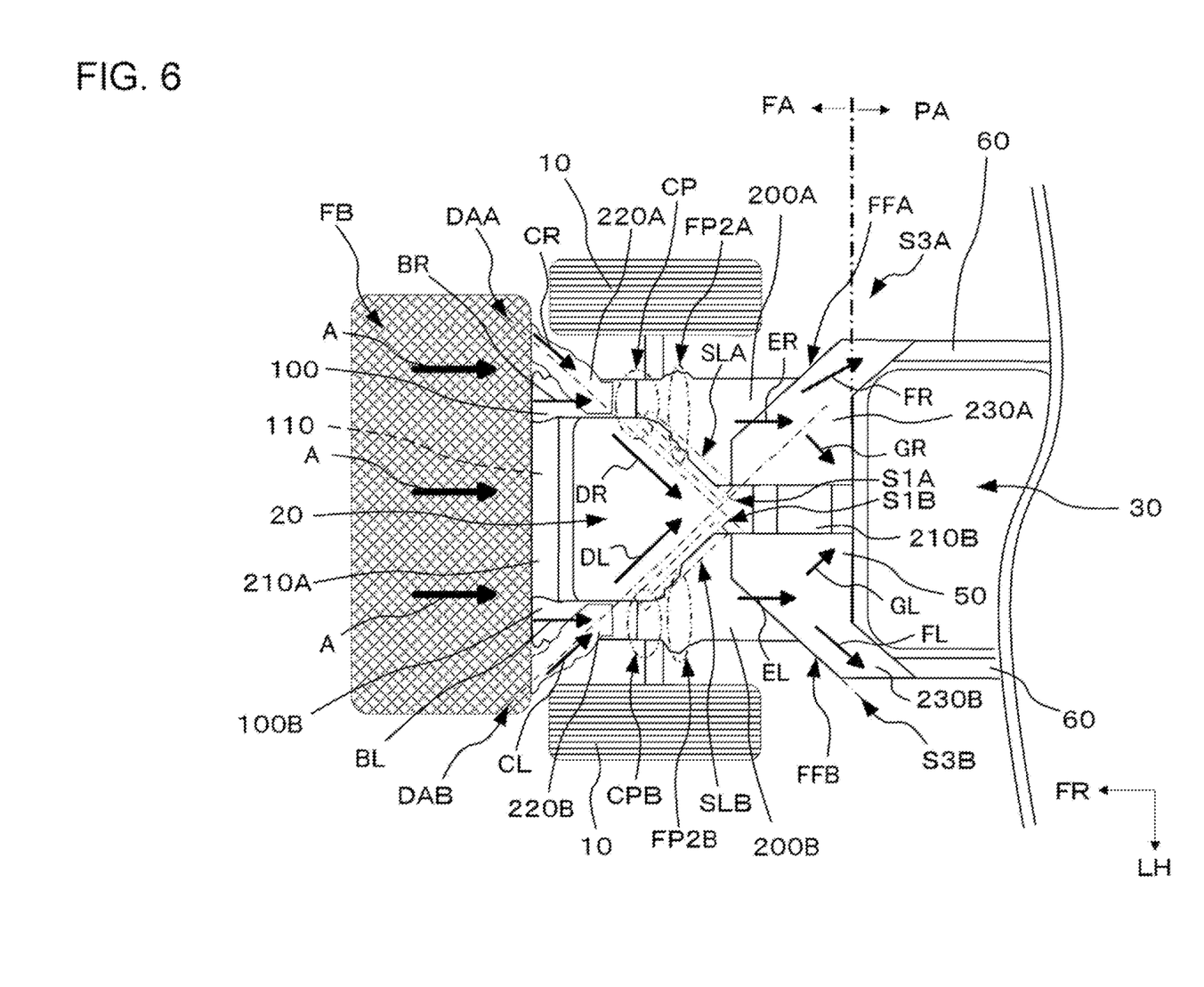
FIG. 6 is a bottom view of the vehicle-body front structure according to the embodiment of the disclosure, illustrating how the vehicle-body front structure deforms in full-overlap collision.

In full-overlap collision, an object impacts on both sides, in the vehicle widthwise direction, of the front face of the vehicle. In offset collision and small-overlap collision, an object impacts on one side, in the vehicle widthwise direction, of the front face of the vehicle. Referring now to FIGS. 5 and 6, how the vehicle-body front structure S according to the present embodiment that is configured as described above functions at the occurrence of full-overlap collision will be described.

Case of Full-Overlap Collision

As illustrated in FIGS. 5 and 6, in full-overlap collision of an object FB with the vehicle V, collision energy is applied as indicated by arrows A.

The collision energy applied to the front part of the vehicle V as indicated by the arrows A is transmitted to the front side frames 100, the sub frames 200, and the lap frames 220.

The front side frames 100 each receive the collision energy transmitted as indicated by an arrow U (arrow UR or UL) from the front side toward the rear side. Accordingly, the fragile parts FP1 at the front ends of the respective front side frames 100 collapse under the collision energy, and the front side frames 100 start to deform. Furthermore, since the bent parts FP3 are pushed toward the rear side, the front side frames 100 deform toward the rear side in such a manner as to bend with the points of coupling thereof to the torque box 50 acting as the fulcrums. Thus, the collision energy is absorbed by the deformation of the front side frames 100.

The sub frames 200 each receive the collision energy transmitted as indicated by an arrow B (arrow BR or BL) from the front side toward the rear side. The axial lines S2 of the respective sub frames 200 are inclined from the central portions CP of the sub frames 200 toward the upper front side. Therefore, the sub frames 200 deform upward in such a manner as to bend with the fragile parts FP2 thereof acting as the fulcrums. While the sub frames 200 are deforming by receiving the collision energy, the fragile parts FP2 start to collapse. Thus, the collision energy is absorbed by the deformation of the sub frames 200.

The lap frames 220 each receive the collision energy transmitted as indicated by an arrow C (arrow CR or CL) from the front side toward the rear side. The lap frames 200 start to deform under the collision energy. The axial lines DA of the respective lap frames 220 are inclined from the central portions CP of the respective sub frames 200 toward the lower front side. Therefore, the lap frames 220 deform downward with the central portions CP of the sub frames 200 acting as the fulcrums. Thus, the collision energy is absorbed by the deformation of the lap frames 220.

As illustrated in FIG. 6, the collision energy transmitted to each of the sub frames 200 and each of the lap frames 220 as indicated by the corresponding arrow B and the corresponding arrow C is dispersed into collision energy to be transmitted as indicated by an arrow E (arrow ER or EL) and collision energy to be transmitted as indicated by an arrow D (arrow DR or DL). The collision energy transmitted as indicated by the arrow E causes the sub frame 200 to further collapse and is further transmitted to a corresponding one of the reaction-transmitting frames 230. The collision energy transmitted from each of the two sides in the vehicle widthwise direction as indicated by the corresponding arrow D is transmitted through the power unit 20, which is in close contact with the oblique parts SL of both of the sub frames 200, to one of the reaction-transmitting frames 230 that is on the opposite side from the impact-receiving point in the vehicle widthwise direction. The axial line DA of each of the lap frames 220 is parallel to the edge line S1 of a corresponding one of the sub frames 200 and to the edge line S3 of a corresponding one of the reaction-transmitting frames 230. Furthermore, in plan view and on each of the axial lines DA, a corresponding one of the lap frames 220, a corresponding one of the sub frames 200, the power unit 20, and a corresponding one of the reaction-transmitting frames 230 are aligned and are in contact with and fixed to one another. Therefore, the collision energy transmitted from each of the two sides in the vehicle widthwise direction as indicated by the corresponding arrow D efficiently reaches one of the reaction-transmitting frames 230 that is on the opposite side from the impact-receiving point in the vehicle widthwise direction.

The reaction-transmitting frames 230 each receive the collision energy transmitted as indicated by a corresponding one of the arrows E and the collision energy transmitted as indicated by a corresponding one of the arrows D. The collision energy received by each of the reaction-transmitting frames 230 is dispersed into collision energy to be transmitted to a corresponding one of the side sills 60 as indicated by an arrow F (arrow FR or FL) and collision energy to be transmitted to the torque box 50 and to the sub cross member 210B as indicated by an arrow G (arrow GR or GL).

Thus, the collision energy is absorbed by the deformation of the sub frames 200 and is dispersed over the power unit 20, the reaction-transmitting frames 230, the sub cross member 210B, the torque box 50, the side sills 60, and so forth.

As described above, the collision energy is efficiently dispersed over the strong skeletal frame having a crisscross configuration in which the sub frames 200A and 200B, the sub cross members 210A and 210B, the torque box 50, the side sills 60, and the reaction-transmitting frames 230A and 230B are coupled to one another. Furthermore, the collision energy thus dispersed is absorbed by the deformation of the crisscross skeletal frame.

When the input of collision energy ends, the absorption of the collision energy by the deformation of the vehicle-body front structure S ends.

Case of Small-Overlap Collision

Figure 7:
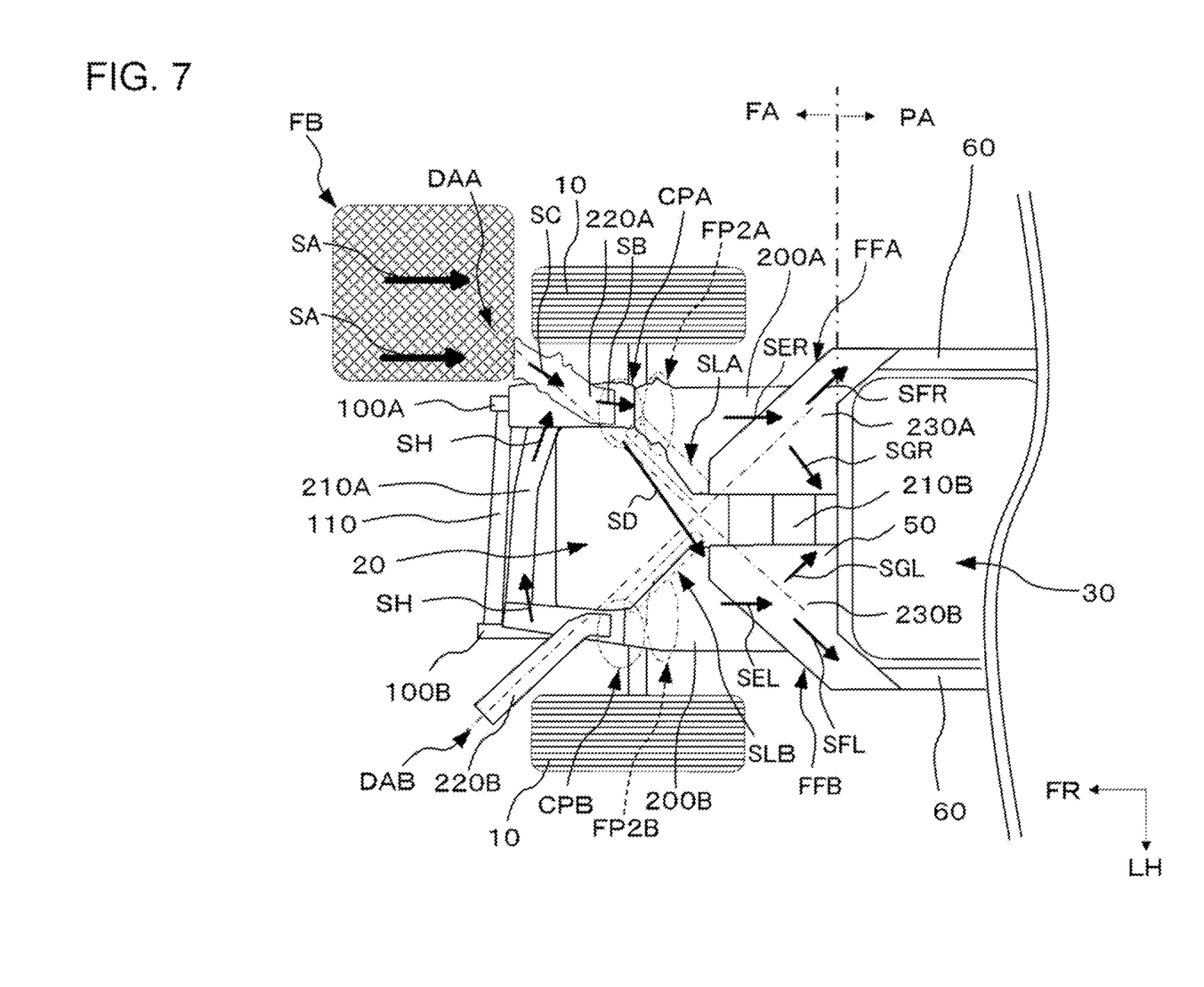
FIG. 7 is a bottom view of the vehicle-body front structure according to the embodiment of the disclosure, illustrating how the vehicle-body front structure deforms in small-overlap collision.

In small-overlap collision, as illustrated in FIG. 7, an object FB impacts on one side, in the vehicle widthwise direction, of the front face of the vehicle, and collision energy is applied as indicated by arrows SA. Referring to FIG. 7, a case of collision on the right side, in front view, of the vehicle V will now be described.

As illustrated in FIG. 7, in small-overlap collision of an object FB with the vehicle V, collision energy is applied to the vehicle V as indicated by the arrows SA.

The collision energy applied from the object FB to the right side (the side on which the arrows SA are provided in FIG. 7) of the vehicle V in front view is transmitted through the lap frame 220A to the sub frame 200A and to the sub cross member 210A.

The lap frame 220A receives the collision energy transmitted therethrough as indicated by an arrow SC from the front side toward the rear side. The lap frame 220A starts to collapse between the front end thereof and the central portion CPA of the sub frame 200A. Since the axial line DAA of the lap frame 220A is inclined from the central portion CPA toward the lower front side, the lap frame 220A deforms downward with the central portion CPA of the sub frame 200A acting as the fulcrum. Thus, the collision energy is absorbed by the deformation of the lap frame 220A.

The sub frame 200A receives the collision energy transmitted from the lap frame 220A as indicated by an arrow SB to the central portion CPA thereof. Accordingly, the fragile part FP2A of the sub frame 200A deforms. Since the fragile part FP2A deforms, the sub cross member 210A is pulled as indicated by an arrow SH. Accordingly, the sub frame 200B that is on the opposite side from the impact-receiving point in the vehicle widthwise direction deforms toward the inner side in the vehicle widthwise direction with the fragile part FP2B thereof acting as the fulcrum. Furthermore, the collision energy transmitted from the lap frame 220A is dispersed into collision energy to be transmitted through the sub frame 200A as indicated by an arrow SER and collision energy to be transmitted as indicated by an arrow SD. The collision energy transmitted as indicated by the arrow SER causes the sub frame 200A to further collapse and is further transmitted to the reaction-transmitting frame 230A. The collision energy transmitted as indicated by the arrow SD is transmitted through the power unit 20, which is in close contact with the oblique part SLA of the sub frame 200A, to the reaction-transmitting frame 230B that is on the opposite side from the impact-receiving point in the vehicle widthwise direction. In plan view and on the axial line DAA, the lap frame 220A, the sub frame 200A, the power unit 20, and the reaction-transmitting frame 230B are aligned and are in contact with and fixed to one another. Therefore, the collision energy transmitted as indicated by the arrow SD is efficiently transmitted to the reaction-transmitting frame 230B that is on the opposite side from the impact-receiving point in the vehicle widthwise direction. The collision energy transmitted to the reaction-transmitting frame 230B is dispersed into collision energy to be transmitted to a corresponding one of the side sills 60 as indicated by an arrow SFL and collision energy to be transmitted to the torque box 50 and the sub cross member 210B as indicated by an arrow SGL.

Meanwhile, the reaction-transmitting frame 230A receives collision energy transmitted as indicated by the arrow SER. The sub frame 200A and the reaction-transmitting frame 230A having the front edge FFA are aligned on a straight line and are fixed to each other. Therefore, the collision energy transmitted to the reaction-transmitting frame 230A is efficiently transmitted to a corresponding one of the side sills 60 as indicated by the arrow SFR and to the torque box 50 and the sub cross member 210B as indicated by the arrow SGR. Thus, the collision energy is absorbed by the deformation of the sub frames 200 and is efficiently dispersed over the power unit 20, the reaction-transmitting frames 230A and 230B, the sub cross member 210B, the torque box 50, the side sills 60, and so forth.

As described above, the collision energy is dispersed over the strong skeletal frame having a crisscross configuration in which the sub frames 200A and 200B, the sub cross members 210A and 210B, the torque box 50, the side sills 60, and the reaction-transmitting frames 230A and 230B are coupled to one another. Furthermore, the collision energy thus dispersed is absorbed by the deformation of the crisscross skeletal frame.

When the input of collision energy ends, the absorption of the collision energy by the deformation of the vehicle-body front structure S ends.

To summarize, the vehicle-body front structure S according to the present embodiment includes the pair of front side frames 100, the pair of sub frames 200, the power unit 20, the pair of lap frames 220, and the pair of reaction-transmitting frames 230. The front side frames 100 are disposed in a front part of the vehicle V on the two respective sides in the vehicle widthwise direction and each extend in the vehicle front-rear direction. The sub frames 200 are disposed below the respective front side frames 100 on the two respective sides in the vehicle widthwise direction and each extend in the vehicle front-rear direction. The power unit 20 is disposed between the sub frames 200 in the vehicle widthwise direction and is configured to drive the front wheels 10 of the vehicle V. The lap frames 220 are each coupled to a corresponding one of the sub frames 200 at a front part of the lower surface of the sub frame 200 and each project toward the outer front side of the vehicle V. The reaction-transmitting frames 230 are each coupled to a corresponding one of the sub frames 200 at the lower surface of the rear end of the sub frame 200 and each project toward the outer rear side of the vehicle V. The sub frames 200 each includes the oblique part SL in the central portion CP thereof. The oblique part SL extends toward the inner rear side of the vehicle V such that the width of the sub frame 200 increases along the oblique part SL. The power unit 20 is in contact with and fixed to the oblique parts SLA and SLB of the sub frames 200A and 200B that are on the two respective sides in the vehicle widthwise direction. The axial line DA of each of the lap frames 220 is parallel to the edge line S1 of one of the sub frames 200 that is on the same side as the lap frame 220 of interest in the vehicle widthwise direction and to the edge line S3 of one of the reaction-transmitting frames 230 that is on the opposite side from the lap frame 220 of interest in the vehicle widthwise direction.

That is, in plan view and on each of the axial lines DA, a corresponding one of the lap frames 220, a corresponding one of the sub frames 200, the power unit 20, and a corresponding one of the reaction-transmitting frames 230 are aligned and are in contact with and fixed to one another. Therefore, in the vehicle-body front structure S, the collision energy transmitted to the lap frames 220 and the sub frames 200 is dispersed through the power unit 20 and the reaction-transmitting frames 230 to the sub cross members 210A and 210B, to the torque box 50, and to the side sills 60. In other words, in the vehicle-body front structure S, the collision energy is dispersed over the strong skeletal frame having a crisscross configuration in which the sub frames 200A and 200B, the sub cross members 210A and 210B, the torque box 50, the side sills 60, and the reaction-transmitting frames 230A and 230B are coupled to one another. Furthermore, the collision energy thus dispersed is absorbed within the vehicle front space FA by the deformation of the crisscross skeletal frame.

Such a configuration reduces the probability of deformation of the cabin CA and the battery pack 30 that are located in the protected area PA.

Furthermore, in the vehicle-body front structure S according to the present embodiment, the sub frames 200 include the respective fragile parts FP2 at the respective oblique parts SL, and the lap frames 220 are coupled to the respective sub frames 200 at positions that are on the front side relative to the fragile parts FP2.

In such a configuration, even in small-overlap collision in which collision energy is received by one of the lap frames 220, the collision energy is transmitted through both of the sub frames 200 and reaches the respective fragile parts FP2 of the sub frames 200. Thus, in the vehicle-body front structure S, the collision energy is absorbed within the vehicle front space FA by the deformation of the fragile parts FP2.

Such a configuration reduces the probability of deformation of the cabin CA and the battery pack 30 that are located in the protected area PA.

While the above embodiment of the disclosure relates to a configuration in which the sub frames 200 and the lap frames 220 are disposed below the drive shaft of the power unit 20, the sub frames 200 or the lap frames 220 may have through-holes so that the drive shaft of the power unit 20 are made to extend through the through-holes.

While the embodiment of the disclosure has been described above with reference to the accompanying drawings, details of the individual elements are not limited to those described in the above embodiment and may be changed within the scope of the disclosure.

The invention claimed is:

1. A vehicle-body front structure comprising:
   front side frames in a pair, the front side frames being disposed in a front part of a vehicle on respective sides in a vehicle widthwise direction, the front side frames each extending in a vehicle front-rear direction;
   sub frames in a pair, the sub frames being disposed below the respective front side frames on the respective sides in the vehicle widthwise direction, the sub frames each extending in the vehicle front-rear direction;
   a power unit disposed between the sub frames in the vehicle widthwise direction and configured to drive front wheels of the vehicle;
   lap frames in a pair, the lap frames each including one end coupled to a corresponding one of the sub frames at a front part of a lower surface of the sub frame, and another end projecting toward an outer front side of the vehicle; and
   reaction-transmitting frames in a pair, reaction-transmitting frames each including one end coupled to a corresponding one of the sub frames at a lower surface of a rear end of the sub frame, and another end projecting toward an outer rear side of the vehicle,
   wherein each of the sub frames comprises an oblique part in a central portion of the each of the sub frames, the oblique part extending toward an inner rear side of the vehicle, and each of the sub frames has a greater width on a rear side relative to the oblique part than on a front side relative to the oblique part,
   wherein the power unit is in contact with and fixed to the oblique part of each of the sub frames that is on a corresponding one of the respective sides in the vehicle widthwise direction, and
   wherein an axial line of each of the lap frames is parallel to an edge line of the oblique part of one of the sub frames that is on a same side as the each of the lap frames in the vehicle widthwise direction and to an edge line of a front edge of one of the reaction-transmitting frames that is on an opposite side from the each of the lap frame in the vehicle widthwise direction.

2. The vehicle-body front structure according to claim 1, wherein each of the sub frames comprises a fragile part at the oblique part, and
   wherein each of the lap frames is coupled to the corresponding one the sub frames at a position that is on the front side relative to the fragile part.

\* \* \* \* \*